US011106988B2

(12) United States Patent
Gohl et al.

(10) Patent No.: US 11,106,988 B2
(45) Date of Patent: Aug. 31, 2021

(54) SYSTEMS AND METHODS FOR DETERMINING PREDICTED RISK FOR A FLIGHT PATH OF AN UNMANNED AERIAL VEHICLE

(71) Applicant: GOPRO, INC., San Mateo, CA (US)

(72) Inventors: Pascal Gohl, Zurich (CH); Sammy Omari, Winterthur (CH)

(73) Assignee: GoPro, Inc., San Mateo, CA (US)

(*) Notice: Subject to any disclaimer, the term of this patent is extended or adjusted under 35 U.S.C. 154(b) by 947 days.

(21) Appl. No.: 15/287,710

(22) Filed: Oct. 6, 2016

(65) Prior Publication Data

US 2018/0101782 A1 Apr. 12, 2018

(51) Int. Cl.
*G06N 7/00* (2006.01)
*G08G 5/04* (2006.01)
(Continued)

(52) U.S. Cl.
CPC ........... *G06N 7/005* (2013.01); *B64C 39/024* (2013.01); *G08G 5/0013* (2013.01);
(Continued)

(58) Field of Classification Search
None
See application file for complete search history.

(56) References Cited

U.S. PATENT DOCUMENTS

| 6,633,685 B1 | 10/2003 | Kusama | |
|---|---|---|---|
| 7,194,353 B1 * | 3/2007 | Baldwin | G01C 21/00 701/301 |

(Continued)

FOREIGN PATENT DOCUMENTS

| JP | H09181966 A | 7/1997 |
|---|---|---|
| JP | 2005252459 A | 9/2005 |

(Continued)

OTHER PUBLICATIONS

Hornung, A et al., "Octomap: an efficient probabilistic 3D mapping framework based on octrees," Autonomous Robots vol. 34 (2013) pp. 189-206. (Year: 2013).*

(Continued)

*Primary Examiner* — Brian M Smith
(74) *Attorney, Agent, or Firm* — Young Basile Hanlon & MacFarlane, P.C.

(57) ABSTRACT

This disclosure relates to systems and methods for determining predicted risk for a flight path of an unmanned aerial vehicle. A previously stored three-dimensional representation of a user-selected location may be obtained. The three-dimensional representation may be derived from depth maps of the user-selected location generated during previous unmanned aerial vehicle flights. The three-dimensional representation may reflect a presence of objects and object existence accuracies for the individual objects. The object existence accuracies for the individual objects may provide information about accuracy of existence of the individual objects within the user-selected location. A user-created flight path may be obtained for a future unmanned aerial flight within the three-dimensional representation of the user-selected location. Predicted risk may be determined for individual portions of the user-created flight path based upon the three-dimensional representation of the user-selected location.

18 Claims, 5 Drawing Sheets

(51) Int. Cl.
  *G08G 5/00* (2006.01)
  *B64C 39/02* (2006.01)
(52) U.S. Cl.
  CPC ......... *G08G 5/0026* (2013.01); *G08G 5/0034* (2013.01); *G08G 5/0069* (2013.01); *G08G 5/045* (2013.01)

(56) References Cited

U.S. PATENT DOCUMENTS

| | | |
|---|---|---|
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,606,073 B2 | 12/2013 | Woodman |
| 8,774,560 B2 | 7/2014 | Sugaya |
| 8,965,598 B2* | 2/2015 | Kruglick ............... B64C 39/024 244/75.1 |
| 8,971,623 B2 | 3/2015 | Gatt |
| 8,990,328 B1 | 3/2015 | Grigsby |
| 9,041,727 B2 | 5/2015 | Ubillos |
| 9,142,257 B2 | 9/2015 | Woodman |
| 9,334,052 B2* | 5/2016 | Pasko ................... B64C 39/024 |
| 9,342,376 B2 | 5/2016 | Jain |
| 9,418,283 B1 | 8/2016 | Natarajan |
| 9,594,372 B1* | 3/2017 | Sills ......................... A61H 3/06 |
| 10,029,804 B1* | 7/2018 | Chamberlain ............ G06T 7/11 |
| 2002/0165721 A1 | 11/2002 | Chang |
| 2004/0001706 A1 | 1/2004 | Jung |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2008/0123976 A1 | 5/2008 | Coombs |
| 2008/0183843 A1 | 7/2008 | Gavin |
| 2009/0019995 A1 | 1/2009 | Miyajima |
| 2009/0027499 A1 | 1/2009 | Nicholl |
| 2009/0088916 A1 | 4/2009 | Elgersma |
| 2009/0125559 A1 | 5/2009 | Yoshino |
| 2009/0252474 A1 | 10/2009 | Nashida |
| 2009/0276149 A1 | 11/2009 | Kauffman |
| 2010/0046842 A1 | 2/2010 | Conwell |
| 2010/0086216 A1 | 4/2010 | Lee |
| 2010/0161720 A1 | 6/2010 | Colligan |
| 2010/0199182 A1 | 8/2010 | Lanza |
| 2010/0228468 A1 | 9/2010 | D Angelo |
| 2010/0274714 A1 | 10/2010 | Sims |
| 2010/0318660 A1 | 12/2010 | Balsubramanian |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2012/0014673 A1 | 1/2012 | O'Dwyer |
| 2012/0027381 A1 | 2/2012 | Kataoka |
| 2012/0030263 A1 | 2/2012 | John |
| 2012/0141019 A1 | 6/2012 | Zhang |
| 2012/0210205 A1 | 8/2012 | Sherwood |
| 2012/0210228 A1 | 8/2012 | Wang |
| 2012/0237083 A1 | 9/2012 | Lange |
| 2012/0246114 A1 | 9/2012 | Edmiston |
| 2012/0283574 A1 | 11/2012 | Park |
| 2013/0182166 A1 | 7/2013 | Shimokawa |
| 2013/0235071 A1 | 9/2013 | Ubillos |
| 2013/0239051 A1 | 9/2013 | Albouze |
| 2013/0330019 A1 | 12/2013 | Kim |
| 2014/0018979 A1* | 1/2014 | Goossen ............... G08G 5/0034 701/3 |
| 2014/0149865 A1 | 5/2014 | Tanaka |
| 2014/0152762 A1 | 6/2014 | Ukil |
| 2014/0282661 A1 | 9/2014 | Martin |
| 2015/0039646 A1 | 2/2015 | Sharifi |
| 2015/0071547 A1 | 3/2015 | Keating |
| 2015/0113009 A1 | 4/2015 | Zhou |
| 2015/0156247 A1 | 6/2015 | Hensel |
| 2015/0287435 A1 | 10/2015 | Land |
| 2015/0325064 A1 | 11/2015 | Downey |
| 2016/0029105 A1 | 1/2016 | Newman |
| 2016/0070265 A1* | 3/2016 | Liu ........................ B64C 39/024 701/3 |
| 2016/0094601 A1 | 3/2016 | Besehanic |
| 2016/0103830 A1 | 4/2016 | Cheong |
| 2016/0140851 A1* | 5/2016 | Levy .................... G08G 5/0069 701/3 |
| 2016/0189752 A1 | 6/2016 | Galant |
| 2016/0260000 A1 | 9/2016 | Yamakawa |
| 2016/0286235 A1 | 9/2016 | Yamamoto |
| 2017/0153644 A1* | 6/2017 | Otsuka .................. B60W 40/06 |
| 2017/0185850 A1* | 6/2017 | Hsu ....................... B60W 50/14 |
| 2017/0212513 A1* | 7/2017 | Iida ....................... B60W 50/02 |
| 2017/0307733 A1* | 10/2017 | Olshansky ............ G08G 1/165 |
| 2018/0170374 A1* | 6/2018 | Otsuka .................. B60W 50/02 |
| 2018/0173970 A1* | 6/2018 | Bayer .................... G06K 9/629 |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2009040538 | 4/2009 |
| WO | 2012057623 | 5/2012 |
| WO | 2012057623 A1 | 5/2012 |

OTHER PUBLICATIONS

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

Japanese Office Action for JP Application No. 2013-140131, dated Aug. 5, 2014, 6 pages.

Office Action for U.S. Appl. No. 13/831,124, filed Mar. 19, 2015, 14 pages.

PSonar URL: http://www.psonar.com/about retrieved on Aug. 24, 2016, 3 pages.

PCT International Search Report and Written Opinion for PCT/US2015/023680, dated Oct. 6, 2015, 13 pages.

PCT International Written Opinion for PCT/US2015/041624, dated Dec. 17, 2015, 7 Pages.

PCT International Search Report for PCT/US15/41624 dated Nov. 4, 2015, 5 pages.

PCT International Search Report for PCT/US15/23680 dated Aug. 3, 2015, 4 pages.

PCT International Preliminary Report on Patentability for PCT/US2015/023680, dated Oct. 4, 2016, 10 pages.

FFmpeg, "Demuxing," Doxygen, Dec. 5, 2014, 15 Pages, [online] [retrieved on Jul. 13, 2015] Retrieved from the internet<URL:https://www.ffmpeg.org/doxygen/2.3/group_lavf_encoding.html>.

PCT International Search Report and Written Opinion for PCT/US15/12086 dated Mar. 17, 2016, 20 pages.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

(56) References Cited

OTHER PUBLICATIONS

Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512. 03385, 2015, 12 pgs.
Han et al., Deep Compression: Compressing Deep Neural Networks with Pruning, Trained Quantization and Huffman Coding, International Conference on Learning Representations 2016, 14 pgs.
International Preliminary Report on Patentability for Appl. No. PCT/IB2017/055930, dated Apr. 18, 2019, 11 pages.

* cited by examiner

SYSTEMS AND METHODS FOR DETERMINING PREDICTED RISK FOR A FLIGHT PATH OF AN UNMANNED AERIAL VEHICLE

FIELD

The disclosure relates to systems and methods for determining predicted risk for a flight path of an unmanned aerial vehicle.

BACKGROUND

Unmanned aerial vehicles, or UAVs, may be equipped with automated flight control, remote flight control, programmable flight control, other types of flight control, and/or combinations thereof. Some UAVs may include sensors, including but not limited to, image sensors configured to capture image information. UAVs may be used to capture special moments, sporting events, concerts, etc. UAVs may be preconfigured with particular flight control settings. The preconfigured flight control settings may not be individualized based upon known objects within a geographical location.

SUMMARY

The disclosure relates to determining predicted risk for a flight path of an unmanned aerial vehicle ("UAV") based upon a three-dimensional representation of a geographical location, in accordance with one or more implementations. A previously stored three-dimensional representation of a user-selected location may be obtained. The three-dimensional representation may be derived from depth maps of the user-selected location generated during previous unmanned aerial flights. The three-dimensional representation may reflect a presence of objects and object existence accuracies for the individual objects. The object existence accuracies for the individual objects may provide information about accuracy of existence of the individual objects and/or accuracy of existence of boundaries of the individual objects within the user-selected location. A user-created flight path may be obtained for a future unmanned aerial flight within the three-dimensional representation of the user-selected location. Predicted risk may be determined for the individual portions of the user-created flight path based upon the three-dimensional representation of the user-selected location.

In some implementations, a system configured to determine predicted risk for a flight path of an unmanned aerial vehicle may include one or more servers. The server(s) may be configured to communicate with one or more client computing platform(s) according to a client/server architecture. The users of the system may access the system via client computing platform(s). The server(s) may be configured to execute one or more computer program components. The computer program components may include one or more of a representation component, a flight path component, a risk component, and/or other components.

The representation component may be configured to obtain a previously stored three-dimensional representation of a user-selected location. The representation component may be configured to obtain the user-selected location via a current location of the UAV, a current location of the user, a current location of one or more client computing platform(s), a user input received from one or more client computing platform(s), and/or other means. The representation component may be configured to automatically determine the user-selected location based upon a location of one or more client computing platform(s) via a GPS and/or other location tracking system associated with one or more client computing platform(s). The representation component may be configured to automatically determine the user-selected location based upon a location of the UAV via a GPS and/or other location tracking system associated with the UAV.

A repository of depth maps may be available via the system. The depth maps may have been generated during previous unmanned aerial flights. The previous unmanned aerial flights may be associated with the user and/or may be associated with other users. The depth maps may include a depth representation of an environment around the UAV during flight. The depth representation may include objects that were present within the environment around the UAV during flight. The representation component may be configured to retrieve one or more depth maps that include the user-selected location and/or obtain a previously stored three-dimensional representation of the user-selected location based upon the depth maps.

Individual objects included within the three-dimensional representation may be associated with one or more object existence accuracies. The object existence accuracy for the individual objects may provide information about accuracy of existence of the individual objects within the user-selected location. The object existence accuracy for the individual objects may provide information about accuracy of boundaries of the individual objects within the user-selected location.

The flight path component may be configured to obtain a user-created flight path for a future unmanned aerial flight within the three-dimensional representation of the user-selected location. The user-created flight path for the future unmanned aerial flight may be obtained via a user interface associated with one or more client computing platform(s). The user may use an input device to draw the user-created flight path within the three-dimensional representation. The user may select points via an input device within the three-dimensional representation. The flight path component may be configured to automatically determine the user-created flight path based upon the user-selected points within the three-dimensional representation. For example, the flight path component may be configured to connect the user-selected points via straight lines or curved lines to determine the user-created flight path. The flight path component may be configured to define the user-created flight path using coordinate values, such as Cartesian coordinate values.

Obtaining the user-created flight path may include obtaining flight control information such that the UAV may fly autonomously for the future unmanned aerial flight. The flight control information and/or flight control settings may include one or more of an altitude, a longitude, a latitude, a geographical location, a heading, and/or a speed for which UAV may travel during the user-created flight path.

Obtaining the user-created flight path may include obtaining sensor control information such that the UAV may make adjustments to one or more sensors carried by the UAV during the future unmanned aerial flight. A sensor may be configured to generate an output signal conveying visual information (e.g., an image and/or video segment) within a field of view of the UAV. The visual information may include video information, audio information, geolocation information, orientation and/or motion information, depth information, and/or other information. The sensor may be controlled by a sensor control subsystem of the UAV. The sensor control subsystem may be configured to control one or more sensors through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls.

The risk component may be configured to determine predicted risk for individual portions of the user-created flight path based upon the three-dimensional representation of the user-selected location. A first portion of the user-created flight path for which risk is determined may be a point on the user-created flight path. A first portion of the user-created flight path for which risk is determined may be a stretch of the user-created flight path.

The predicted risk for a given portion of the user-created flight path may reflect likelihood of the unmanned aerial vehicle experiencing a collision with one or more objects at or near the given portion of the user-created flight path. Determining the predicted risk may include determining a risk confidence score. The risk confidence score may quantify a likelihood of the unmanned aerial vehicle to collide with the one or more objects within the three-dimensional representation of the user-selected location.

Determining the predicted risk for the individual portions of the user-created flight path may be based upon risk parameters. The risk parameters may include the object existence accuracy, a distance between the UAV along the individual portions of the user-created flight path and the object within the three-dimensional representation, previous collision records of previous UAVs colliding with the one or more objects within the user-selected location, and/or other risk parameters.

Based upon the determined predicted risk for individual portions of the user-created flight path, the risk component may be configured to generate a notification. The notification may include providing a notification to the user, via one or more client computing platform(s), of the predicted risk for the individual portions of the user-created flight path. The notification may include a graphical notification, an audible notification, a sensory notification, and/or other notifications. For example, the notification may include an alert message presented within a display associated with the client computing platform(s). The notification, for example, may include an alert sound audible to the user. An example sensory notification may include a vibration and/or light notification.

Upon the UAV taking off for its unmanned aerial flight based upon the user-created flight path, the system may be configured to track position of the UAV during the unmanned aerial flight. Based upon the user-created flight path, the UAV may be in flight at a particular altitude, longitude, latitude, geographical location, heading, and/or speed.

The risk component may be configured to determine updated predicted risk based upon the tracked position of the UAV. The updated predicted risk may reflect a likelihood of the UAV experiencing a collision with one or more objects at or near the tracked position of the UAV. The system may be configured to detect objects at and/or near the tracked position of the UAV. The risk component may be configured to determine the updated predicted risk based upon the detected objects at and/or near the tracked position of the UAV.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The disclosure relates to determining predicted risk for a flight path of an unmanned aerial vehicle ("UAV") based upon a three-dimensional representation of a geographical location, in accordance with one or more implementations. A previously stored three-dimensional representation of a user-selected location may be obtained. The three-dimensional representation may be derived from depth maps of the user-selected location generated during previous unmanned aerial flights. The three-dimensional representation may reflect a presence of objects and object existence accuracies for the individual objects. The object existence accuracies for the individual objects may provide information about accuracy of existence of the individual objects and/or accuracy of existence of boundaries of the individual objects within the user-selected location. A user-created flight path may be obtained for a future unmanned aerial flight within the three-dimensional representation of the user-selected location. Predicted risk may be determined for the individual portions of the user-created flight path based upon the three-dimensional representation of the user-selected location.

Figure 1:
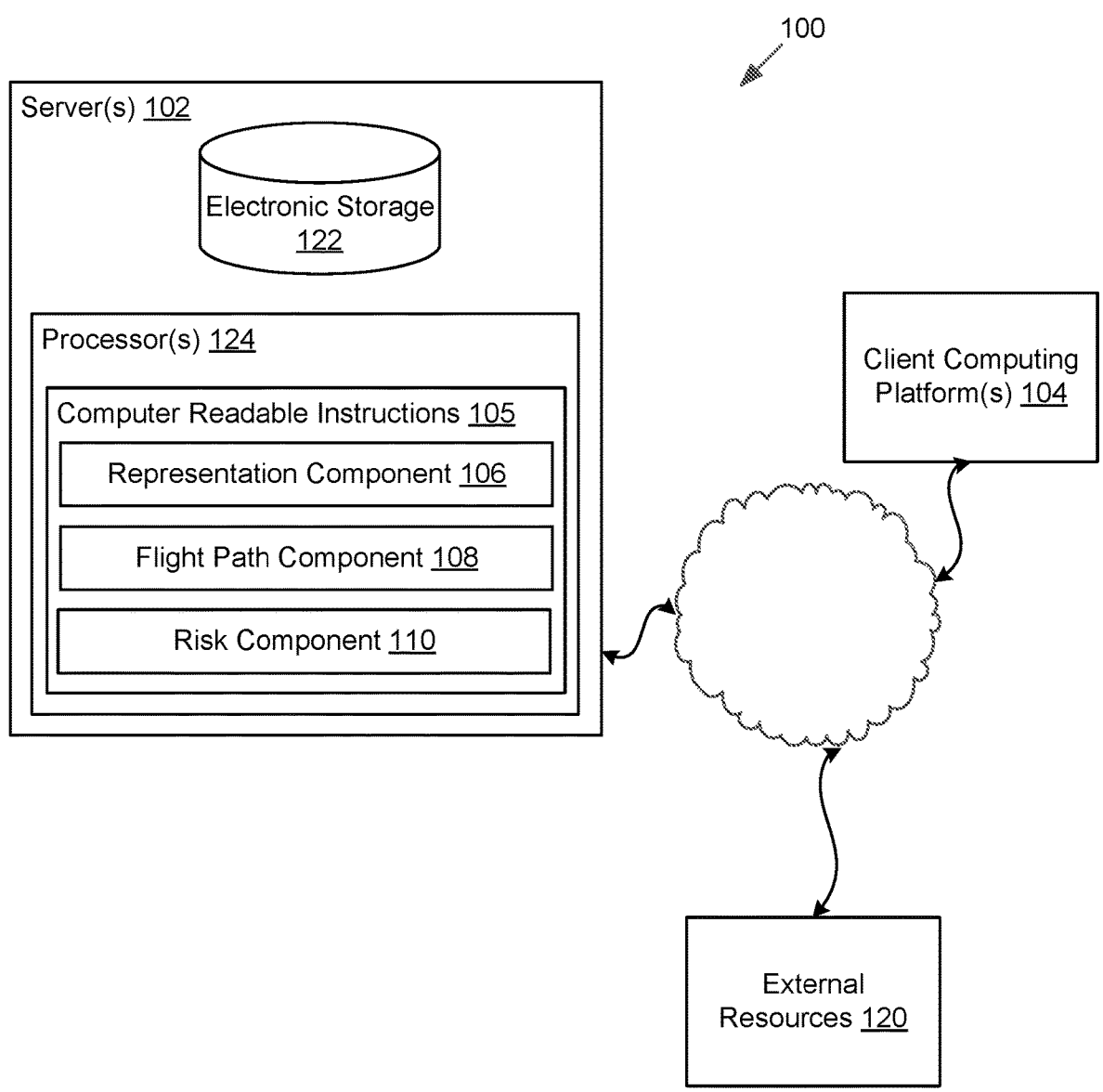
FIG. 1 illustrates a system for determining predicted risk for a flight path of an unmanned aerial vehicle, in accordance with one or more implementations.

FIG. 1 illustrates a system 100 for determining predicted risk for a flight path of an unmanned aerial vehicle, in accordance with one or more implementations. As is illustrated in FIG. 1, system 100 may include one or more servers 102. Server(s) 102 may be configured to communicate with one or more client computing platform(s) 104 according to a client/server architecture. The users of system 100 may access system 100 via client computing platform(s) 104. Server(s) 102 may be configured to execute one or more computer program components. The computer program components may include one or more of representation component 106, flight path component 108, risk component 110, and/or other components.

Representation component 106 may be configured to obtain a previously stored three-dimensional representation of a user-selected location. Representation component 106 may be configured to obtain the user-selected location via a current location of the UAV, a current location of the user, a current location of one or more client computing platform(s) 104, a user input received from one or more client computing platform(s) 104, and/or other means. Representation component 106 may be configured to automatically determine the user-selected location based upon a location of one or more client computing platform(s) 104 via a GPS and/or other location tracking system associated with one or more client computing platform(s) 104. Client computing platform(s) 104 may include one or more of a cellular telephone, a smartphone, a digital camera, a laptop, a tablet computer, a desktop computer, a television set-top box, a smart TV, a gaming console, a remote controller, and/or other client computing platforms. Representation component 106 may be configured to automatically determine the user-selected location based upon a location of the UAV via a GPS and/or other location tracking system associated with the UAV.

The user-selected location may include a name of the user-selected location and/or coordinates of the user-selected location. The user-selected location may include an address, a zip code, a city, a state, a street, a building, and/or any other location. The user-selected location may be defined by a coordinate system, such as the Cartesian coordinate system. The Cartesian coordinate system may include a longitude value and a latitude value. As such, the user-selected location may be defined with respect to the geography of the Earth.

A repository of depth maps may be available via system 100. The depth maps may have been generated during previous unmanned aerial flights. The previous unmanned aerial flights may be associated with the user and/or may be associated with other users. The depth maps may have been previously downloaded depth maps. The depth maps may include a depth representation of an environment around the UAV during flight. The depth representation may include objects that were present within the environment around the UAV during flight. The downloaded depth maps may be refined to include objects that may be within the environment. Representation component 106 may be configured to retrieve one or more depth maps that include the user-selected location and/or obtain a previously stored three-dimensional representation of the user-selected location based upon the depth maps.

In some embodiments, representation component 106 may be configured to generate the three-dimensional representation from the one or more retrieved depth maps that include the user-selected location. For example, the one or more retrieved depth maps may include one or more objects. The one or more objects may be a stationary object or a moving object. The three-dimensional representation may be derived from the one or more retrieved depth maps such that the three-dimensional representation may include the one or more stationary objects and/or moving objects.

The three-dimensional representation may reflect a presence of objects and object existence accuracies for the individual objects. As discussed above, the three-dimensional representation may include the one or more objects detected from the one or more depth maps. The one or more objects may be identified as one or more object types. An object type may refer to one or more categories of objects that have one or more common characteristics. A common characteristic may refer to a permanent or temporary feature of an object relating to the shape, motion, behavior and/or other features of the object. Common characteristics may pertain to an entire object, or one or more portions of the object. Non-limiting examples of object types may include a person, a child, an adult, one or more parts of a person (e.g., arm, hand, head, body, leg, feet, etc.), an animal, a particular kind of animal, one or more parts of an animal, a vehicle, a particular kind of vehicle, one or more parts of a vehicle (e.g., wheel, door, engine, trunk, window, wing, propeller, rotor, etc.), a stationary object, one or more parts of a stationary object (e.g., a tree, a building, a lamppost, etc.), and other object types.

Individual objects included within the three-dimensional representation may be associated with one or more object existence accuracies. The object existence accuracy for the individual objects may provide information about accuracy of existence of the individual objects within the user-selected location. The object existence accuracy for the individual objects may provide information about accuracy of boundaries of the individual objects within the user-selected location.

The object existence accuracies may be defined by numerical values (e.g., 1, 2, n, where a number may define how accurate the object existence is within the three-dimensional representation), a percentage of accuracy (e.g., 100% accurate, 50% accurate, etc.), and/or verbal levels (e.g., very low, low, medium, high, very high, and/or other verbal levels). The object existence accuracies may be quantified and/or defined by other values and/or levels.

For example, a tree may be located at the same location near the user-selected location within all of the depth maps. As such, the tree may be associated with a 100% object existence accuracy. However, the branches of the tree may move with the wind. As such, it may be difficult to determine the object existence accuracy associated with the boundaries of the tree and/or the individual tree branches. For example, uncertainty may exist pertaining to how far the branches of the tree reach out and/or where they may be located. As such, individual tree branches may be associated with a less than 50% object existence accuracy.

Representation component 106 may be configured to effectuate presentation, via a display associated with one or more client computing platform(s) 104, of the three-dimensional representation that includes the user-selected location. Display of the three-dimensional representation that includes the user-selected location may include an area surrounding the user-selected location. The areas surrounding the user-selected location that may be displayed may include a dynamic radius of a particular length that may be changed. Representation component 106 may allow a user to move and/or scroll the three-dimensional representation in different directions (e.g., left, right, up, and/or down) in order to display different portions of the three-dimensional representation. Representation component 106 may allow a user to zoom in and/or out of particular locations and/or regions of the three-dimensional representation in order to display the three-dimensional representation in greater or less detail.

Figure 2A:
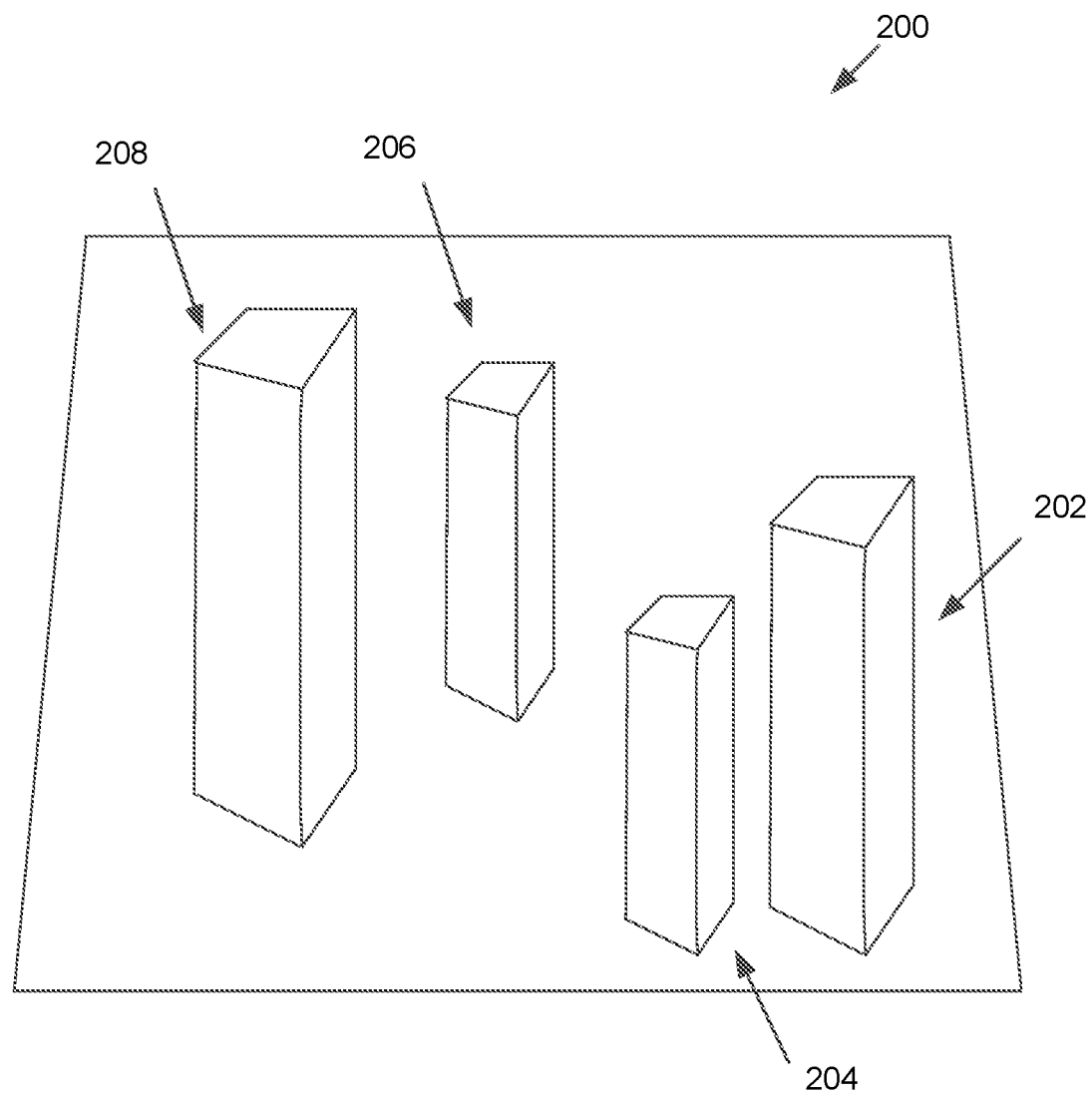
FIG. 2A illustrates an exemplary depiction of a three-dimensional representation of a user-selected location, in accordance with one or more implementations.

For example, and referring to FIGS. 1 and 2A, three-dimensional representation 200 of a user-selected location is depicted in FIG. 2A. Three-dimensional representation 200 may be displayed via a display associated with one or more client computing platform(s) 104. Three-dimensional representation 200 may reflect the presence of objects 202, 204, 206, and 208. Objects 202, 204, 206, and 208 may have been derived from depth maps of the user-selected location generated during previous unmanned aerial flights. While not shown, three-dimensional representation 200 may include the identified object types, and/or object existence accuracies associated with objects 202, 204, 206, and 208 and/or boundaries of objects 202, 204, 206, and 208.

Returning to FIG. 1, flight path component 108 may be configured to obtain a user-created flight path for a future unmanned aerial flight within the three-dimensional representation of the user-selected location. The user-created flight path for the future unmanned aerial flight may be obtained via a user interface associated with one or more client computing platform(s) 104. The user may use an input device to draw the user-created flight path within the three-dimensional representation. The input device may include, but is not limited to, the user's finger, a mouse, a stylus, and/or other objects. The user may select points (e.g., via an input device such as the user's finger, a mouse, a stylus, and/or other objects) within the three-dimensional representation. Flight path component 108 may be configured to automatically determine the user-created flight path based upon the user-selected points within the three-dimensional representation. For example, flight path component 108 may be configured to connect the user-selected points via straight lines or curved lines to determine the user-created flight path. Flight path component 108 may be configured to define the user-created flight path using coordinate values, such as Cartesian coordinate values, as discussed above.

Obtaining the user-created flight path may include obtaining flight control information such that the UAV may fly autonomously for the future unmanned aerial flight. Flight control settings may include functions including, but not limited to, flying the UAV in a stable manner, tracking people or objects, avoiding collisions, and/or other functions useful for autonomously flying the UAV. In some implementations, flight control information and/or flight control settings may be received via the user interface associated with one or more client computing platform(s) 104. The flight control information and/or flight control settings may include one or more of an altitude, a longitude, a latitude, a geographical location, a heading, and/or a speed for which UAV may travel during the user-created flight path. Flight path component 108 may be configured to obtain user inputs regarding the flight control information and/or flight control settings. The flight control information and/or flight control settings may be associated with the user-created flight path. Different portions of the user-created flight path may be associated with different flight control settings. For example, for the first 50 feet of travel distance or first 30 seconds of travel time of the user-created flight path, the user may want the UAV to travel at a particular altitude, or a particular speed, or even hover in a particular location at a particular altitude. For the next 100 feet of travel distance or next 60 seconds of travel time, the user may want the UAV to increase its speed and travel in a forward direction. The flight control information and/or flight control settings may include the UAV performing an aerobatics trick, such as an inverted flip, a spin, a roll, and/or other aerobatics tricks. In some implementations, the flight control information may be transmitted by a remote controller. The flight control information may be overridden at any time.

Obtaining the user-created flight path may include obtaining sensor control information such that the UAV may make adjustments to one or more sensors carried by the UAV during the future unmanned aerial flight. A sensor may be configured to generate an output signal conveying visual information (e.g., an image and/or video segment) within a field of view of the UAV. The visual information may include video information, audio information, geolocation information, orientation and/or motion information, depth information, and/or other information. The sensor may be controlled by a sensor control subsystem of the UAV. The sensor control subsystem may be configured to control one or more sensors through adjustments of an aperture timing, an exposure, a focal length, an angle of view, a depth of field, a focus, a light metering, a white balance, a resolution, a frame rate, an object of focus, a capture angle, a zoom parameter, a video format, a sound parameter, a compression parameter, and/or other sensor controls. As such, and similarly as discussed above, flight path component 108 may be configured to obtain user inputs regarding the sensor control information. The sensor control information may be associated with the user-created flight path. Different portions of the user-created flight path may be associated with different sensor control information. For example, the user may want the UAV to hover at a particular altitude and zoom into a particular location. In some implementations, the sensor control information may be transmitted by a remote controller. The sensor control information may be overridden at any time.

Figure 2B:
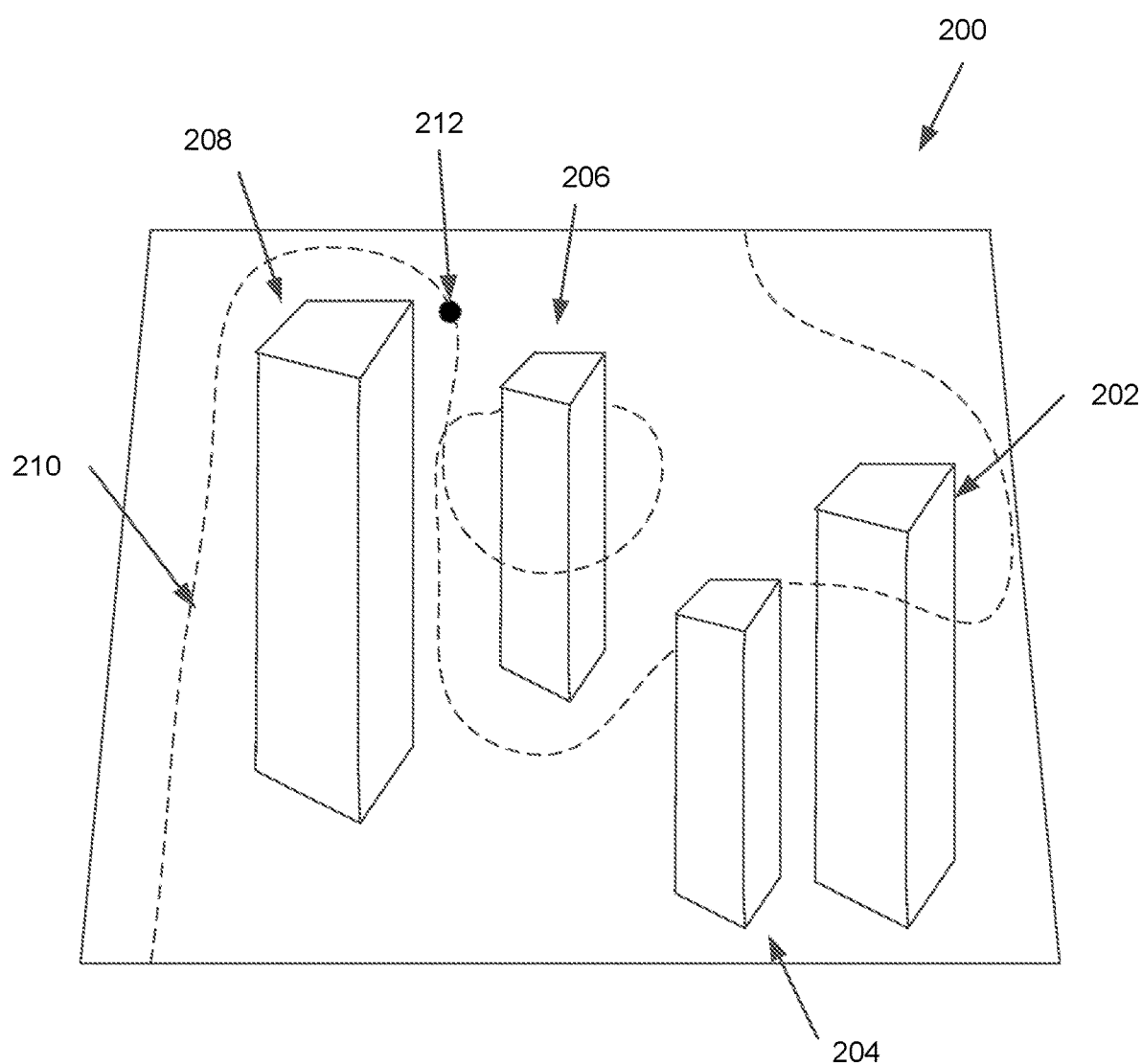
FIG. 2B illustrates an exemplary depiction of a user-created flight path, in accordance with one or more implementations.

For example, and referring to FIGS. 1 and 2B, flight path component 108 may be configured to obtain user-created flight path 210. As shown in FIG. 2B, user-created flight path 210 may weave in and out of and/or loop around one or more objects 202, 204, 206, and/or 208. User-created flight path 210 may include point 212. Point 212 may represent a location along user-created flight path 210 where the user would like the UAV to hover for 5 seconds and zoom into the user-selected location while capturing a video segment.

Flight path component 108 may be configured to store the user-created flight path within electronic storage 122 and/or external storage devices. The user may view, edit, and/or change the user-created flight path at any time before, during, and/or after the unmanned aerial flight.

Referring back to FIG. 1, risk component 110 may be configured to determine predicted risk for individual portions of the user-created flight path based upon the three-dimensional representation of the user-selected location. A first portion of the user-created flight path for which risk is determined may be a point on the user-created flight path. For example, the first portion of the user-created flight path for which risk is determined may be at a particular point (e.g., point A) that may be defined by a particular set of coordinate values (e.g., longitude and latitude values). A first portion of the user-created flight path for which risk is determined may be a stretch of the user-created flight path. For example, the first portion of the user-created flight path for which risk is determined may be from a first point within the user-created flight path (e.g., point A) to a second point within the user-created flight path (e.g., point B). The points (e.g., point A and point B) may be defined by a particular set of coordinate values (e.g., longitude and latitude values), such that the stretch of the user-created flight path may be defined by the stretch of flight path between the coordinate values of point A and point B.

The predicted risk for a given portion of the user-created flight path may reflect likelihood of the unmanned aerial vehicle experiencing a collision with one or more objects at or near the given portion of the user-created flight path. Determining the predicted risk may include determining a risk confidence score. The risk confidence score may quantify a likelihood of the unmanned aerial vehicle to collide with the one or more objects within the three-dimensional representation of the user-selected location. The risk confidence score may be a sliding scale of numerical values (e.g., 1, 2, . . . n, where a number may be assigned as low and/or high) and/or verbal levels (e.g., very low, low, medium, high, very high, and/or other verbal levels). For example, on a sliding scale of 0-5, where 0 represents a very low likelihood of collision and 5 represents a very high likelihood of collision, risk component 110 may be configured to determine that, based upon the user-created flight path, the risk confidence score of UAV hitting an object during the first portion of the user-created flight path (e.g., where the first portion may include the first 2 minutes of flight time traveling at 30 miles per hour) is 0, but at 2 minutes and approximately 5 seconds of flight time within the user-created flight path traveling at the same speed, the risk confidence score of the UAV colliding with a tree branch is 3.

Individual portions of the user-created flight path may have one or more risk confidence scores associated with it. Referring to the example above, the risk confidence score of the UAV colliding with the tree trunk at 2 minutes and 5 seconds of flight time within the user-created flight path traveling at the same speed may be determined to be 0, but the risk confidence score of the UAV colliding with one of the tree branches at 2 minutes and 5 seconds of flight time within the user-created flight path traveling at the same speed may be determined to be 3.

Determining the predicted risk for the individual portions of the user-created flight path may be based upon risk parameters. The risk parameters may include the object existence accuracy, a distance between the UAV along the individual portions of the user-created flight path and the object within the three-dimensional representation, previous collision records of previous UAVs colliding with the one or more objects within the user-selected location, and/or other risk parameters. Risk component 110 may be configured to use an algorithm to determine the predicted risk for the individual portions of the user-created flight path based upon any of the risk parameters. The risk confidence scores may vary based upon any one of the risk parameters.

Determining the predicted risk for the individual portions of the user-created flight path may be based upon one or more object existence accuracies. As discussed above, objects within the three-dimensional representation may be associated with one or more object existence accuracies. Objects may be stationary or moving. Stationary objects may reflect a higher object existence accuracy than moving objects. However, as discussed above, a tree may be a stationary object, such that the tree may be included within all of the retrieved depth maps from previous unmanned aerial flights including the user-selected location, but the branches of the tree may sway and/or move. As such, the boundaries of the tree (e.g., the tree branches) may be associated with lower object existence accuracies than the tree itself.

Determining the predicted risk for the individual portions of the user-created flight path may be based upon a distance between the UAV along the individual portions of the user-created flight path and the object within the three-dimensional representation. The distance between the UAV along the individual portions of the user-created flight path and the object within the three-dimensional representation may include a range f distances and/or a threshold. For example, if the user-created flight path includes the UAV coming within 5 feet of an object with a high object existence accuracy, then risk component 110 may be configured to determine the predicted risk for the UAV colliding with the object may be higher than if the UAV flew 10 feet away from the object.

Determining the predicted risk for the individual portions of the user-created flight path may be based upon previous collision records of previous UAVs colliding with the one or more objects within the user-selected location. Previous collisions of previous unmanned aerial flights within the user-selected location may be stored. The stored previous collisions may include a location where the UAV collided with the object. The stored previous collisions may include the object that the UAV collided with. Risk component 110 may be configured to use this information to determine the likelihood of the UAV colliding with the same, similar, or other objects near the user-created flight path. Risk component 110 may be configured to retrieve previous risk confidence scores associated with the object(s) that the UAV previously collided with. Risk component 110 may be configured to adjust the predicted risk and/or the risk confidence score based upon the previous risk confidence scores associated with the object(s) that the UAV previously collided with within the user-selected location.

Based upon the determined predicted risk for individual portions of the user-created flight path, risk component 110 may be configured to generate a notification. The notification may include providing a notification to the user, via one or more client computing platform(s) 104, of the predicted risk for the individual portions of the user-created flight path. The notification may include a graphical notification, an audible notification, a sensory notification, and/or other notifications. For example, the notification may include an alert message presented within a display associated with the client computing platform(s) 104. The notification, for example, may include an alert sound audible to the user. An example sensory notification may include a vibration and/or light notification.

A graphical notification may be presented within a display associated with one or more client computing platform(s) 104. An audible notification may include a notification sound played by a speaker, within one or more earphones, within one or both sides of headphones, and/or other audible notifications. A sensory notification may be delivered via client computing platform(s) 104, one or more display devices associated with client computing platform(s) 104, one or more control (e.g., user interfacing) devices associated with client computing platform(s) 104, and/or other devices.

The notification may indicate portions of the user-created flight path that have higher predicted risk than other portions of the user-created flight path. The notification may provide a suggestion to avoid collision of the one or more objects near the user-created flight path. For example, portions of the user-created flight path that have a higher predicted risk associated with them than other portions of the user-created flight path may be displayed in a different color (e.g., red). Similarly, portions of the user-created flight path that have a lower predicted risk associated with them than other portions of the user-created flight path may be displayed in green, or some other color to distinguish that portion from the other portions. The graphical notification may include an arrow associated with a portion of the user-created flight path with a higher predicted risk associated with it than another portion pointing in a direction that the user may want to change and/or edit that portion of the user-created flight path. An audible notification, for example, may include a spoken message of "High risk of collision. Move East 2 feet to avoid collision". A sound may be played in the right ear of the user to indicate to the user that the user may want to move a portion of the user-created flight path to the East to avoid collision. The sound may be played in the left ear of the user to indicate to the user that the user may want to move a portion of the user-created flight path to the West to avoid collision. This is for exemplary purposes only and not meant to be a limitation of this disclosure, as other notifications and/or combinations of notifications may be generated and/or provided. The notification may be provided to the user via one or more client computing platform(s) 104 in real-time and/or near real-time to flight path component 108 obtaining the user-created flight path.

Figure 2C:
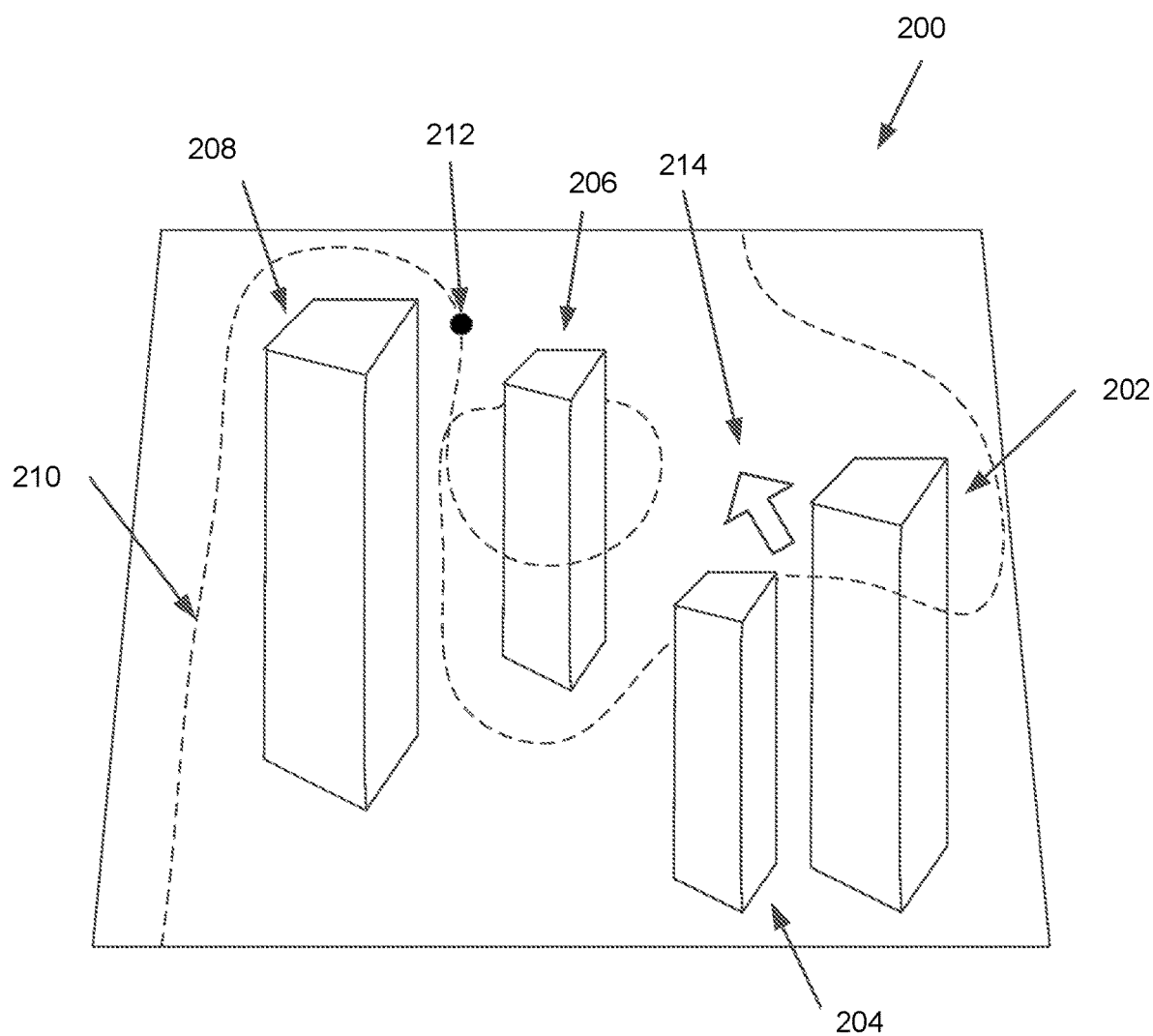
FIG. 2C illustrates an exemplary depiction of a notification of predicted risk for a user-created flight path, in accordance with one or more implementations.

For example, and referring to FIGS. 1 and 2C, notification 214 may be displayed within three-dimensional representation 200. Assume for example that object 204 is a tree. While risk component 110 may be relatively certain that the tree (e.g., object 204) exists within the user-selected location, risk component 110 may determine the boundaries of the tree (e.g., the branches of the tree) with less certainty than the tree (e.g., object 204) itself. As such, risk component 110 may determine that the predicted risk associated with the portion of user-created flight path 210 that approaches object 204 (e.g., the tree) increases significantly the closer user-created flight path 210 gets to object 204. Notification 214 (e.g., an arrow) may be displayed to alert the user to move the portion of user-created flight path 210 near object 204 in a direction indicated by notification 214. Notification 214 may indicate a high likelihood that the UAV may collide with object 204. Notification 214 may indicate that moving user-created flight path 210 in the direction indicated by notification 214 may decrease the likelihood of UAV colliding with object 204. This is for exemplary purposes only and is not meant to be a limitation of this disclosure.

Upon the UAV taking off for its unmanned aerial flight based upon the user-created flight path, system 100 may be configured to track position of the UAV during the unmanned aerial flight. Based upon the user-created flight path, the UAV may be in flight at a particular altitude, longitude, latitude, geographical location, heading, and/or speed. System 100 may be configured to track position of the UAV based upon a GPS and/or other location tracking system associated with the UAV to determine the altitude, longitude, latitude, geographical location, heading, and/or speed of the UAV. A user may manually override the user-created flight path via one or more client computing platform(s) 104 (e.g., a remote controller, etc.).

Risk component 110 may be configured to determine updated predicted risk based upon the tracked position of the UAV. The updated predicted risk may reflect a likelihood of the UAV experiencing a collision with one or more objects at or near the tracked position of the UAV. If the user manually overrides the user-created flight path and veers the UAV in a different direction, risk component 110 may be configured to determine updated predicted risk for the tracked position of the UAV in a similar manner as described above. For example, system 100 may be configured to predict a new flight path for the UAV based upon the tracked position of the UAV. Risk component 110 may be configured to determine the updated predicted risk based upon a three-dimensional representation of the tracked position of the UAV. System 100 may be configured to detect objects at and/or near the tracked position of the UAV. Risk component 110 may be configured to determine the updated predicted risk based upon the detected objects at and/or near the tracked position of the UAV. The user may be notified of the updated predicted risk in a similar manner as discussed above.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, and/or other components. The processor(s) 124 may be configured to execute components 106, 108, 110, and/or other components by software; hardware; firmware; some combination of software, hardware, and/or firmware; and/or other mechanisms for configuring processing capabilities on processor(s) 124.

It should be appreciated that although components 106, 108, and 110 are illustrated in FIG. 1 as being co-located within a single processing unit, in implementations in which processor(s) 124 includes multiple processing units, one or more of components 106, 108, and/or 110 may be located remotely from the other components. The description of the functionality provided by the different components 106, 108, and/or 110 described herein is for illustrative purposes, and is not intended to be limiting, as any of components 106, 108, and/or 110 may provide more or less functionality than is described. For example, one or more of components 106, 108, and/or 110 may be eliminated, and some or all of its functionality may be provided by other ones of components 106, 108, and/or 110. As another example, processor(s) 124 may be configured to execute one or more additional components that may perform some or all of the functionality attributed herein to one of components 106, 108, and/or 110.

Figure 3:
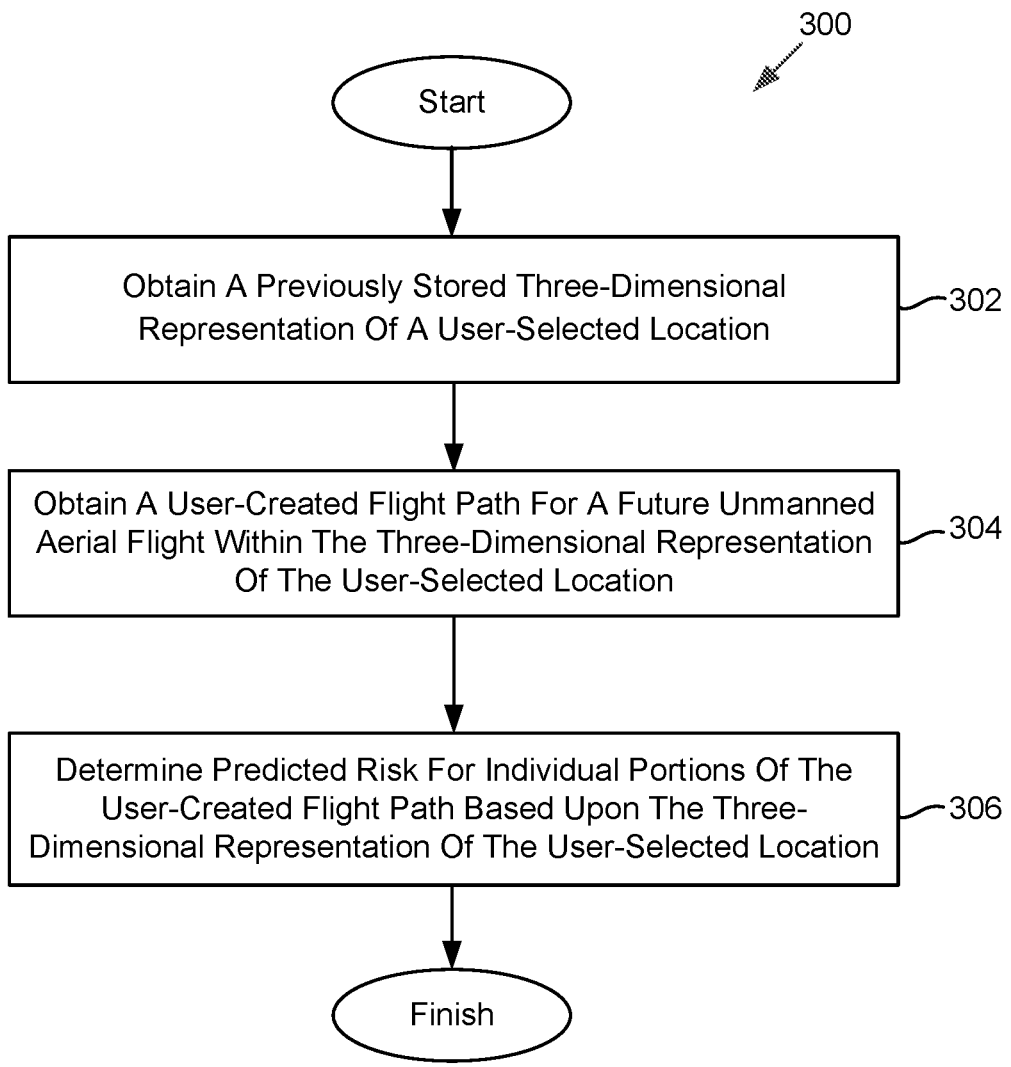
FIG. 3 illustrates a method for determining predicted risk for a flight path of an unmanned aerial vehicle, in accordance with one or more implementations.

FIG. 3 illustrates a method 300 for determining predicted risk for a flight path of an unmanned aerial vehicle, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a previously stored three-dimensional representation of a user-selected location may be obtained. The three-dimensional representation may be derived from depth maps of the user-selected location generated during previous unmanned aerial flights. The three-dimensional representation may reflect a presence of objects and object existence accuracies for the individual objects. The object existence accuracies for the individual objects may provide information about accuracy of existence of the individual objects within the user-selected location. Operation 302 may be performed by a representation component that is the same as or similar to representation component 106, in accordance with one or more implementations.

At an operation 304, a user-created flight path may be obtained for a future unmanned aerial flight within the three-dimensional representation of the user-selected location. Operation 304 may be performed by a flight path component that is the same as or similar to flight path component 108, in accordance with one or more implementations.

At an operation 306, predicted risk for individual portions of the user-created flight path may be determined based upon the three-dimensional representation of the user-selected location. Operation 306 may be performed by a risk component that is the same as or similar to risk component 110, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for determining predicted risk for a flight path of an unmanned aerial vehicle, the system comprising:
   one or more physical processors configured by machine readable instructions to:
   obtain a previously stored three-dimensional representation of a user-selected location, the three-dimensional representation being derived from depth maps of the user-selected location generated during previous unmanned aerial flights, the three-dimensional representation reflecting a presence of objects and object existence accuracies for each individual objects, the object existence accuracies providing information about accuracy of existence of each individual object within the user-selected location;
   obtain a user-created flight path for a future unmanned aerial flight within the three-dimensional representation of the user-selected location; and
   determine predicted risk for individual portions of the user-created flight path based upon the three-dimensional representation of the user-selected location and based upon risk parameters by determining a risk confidence score for each individual object, each risk confidence score representing a likelihood of the unmanned aerial vehicle to collide with each corresponding individual object within the three-dimensional representation of the user-selected location, the risk parameters including the object existence accuracies, a distance between the unmanned aerial vehicle along the individual portions of the user-created flight path and each individual object within the three-dimensional representation, and previous collision records of previous unmanned aerial vehicles colliding with an object within the user selected location.

2. The system of claim 1, wherein a first portion of the user-created flight path for which risk is determined is a point on the user-created flight path.

3. The system of claim 1, wherein the information about accuracy of existence of each individual objects within the user-selected location includes information about accuracy of boundaries of each individual objects within the user-selected location.

4. The system of claim 1, wherein the predicted risk for a given portion of the user-created flight path reflects likelihood of experiencing a collision with one or more of the objects at or near the given portion of the user-created flight path.

5. The system of claim 1, wherein each risk confidence score varies based upon the risk parameters.

6. The system of claim 1, wherein the object existence accuracies reflect a higher object existence accuracy for stationary objects and a lower object existence accuracy for moving objects.

7. The system of claim 1, wherein the one or more physical processors are further configured by machine readable instructions to:
track position of the unmanned aerial vehicle during an unmanned aerial flight.

8. The system of claim 7, wherein the one or more physical computer processors are further configured by computer readable instructions to:
determine updated predicted risk based upon the tracked position of the unmanned aerial vehicle.

9. The system of claim 8, wherein the updated predicted risk reflects a likelihood of experiencing a collision with one or more objects at or near the tracked position of the unmanned aerial vehicle.

10. A method for determining predicted risk for a flight path of an unmanned aerial vehicle, the method comprising:
obtaining a previously stored three-dimensional representation of a user-selected location, the three-dimensional representation being derived from depth maps of the user-selected location generated during previous unmanned aerial flights, the three-dimensional representation reflecting a presence of objects and object existence accuracies for each individual object, the object existence accuracies providing information about accuracy of existence of each individual objects within the user-selected location;
obtaining a user-created flight path for a future unmanned aerial flight within the three-dimensional representation of the user-selected location; and
determining predicted risk for individual portions of the user-created flight path based upon the three-dimensional representation of the user-selected location and based upon risk parameters by determining a risk confidence score for each individual object, each risk confident score representing a likelihood of the unmanned aerial vehicle to collide with each corresponding individual object within the three-dimensional representation of the user-selected location, the risk parameters including the object existence accuracies, a distance between the unmanned aerial vehicle along the individual portions of the user-created flight path and each individual object within the three-dimensional representation, and previous collision records of previous unmanned aerial vehicles colliding with an object within the user selected location.

11. The method of claim 10, wherein a first portion of the user-created flight path for which risk is determined is a point on the user-created flight path.

12. The method of claim 10, wherein the information about accuracy of existence of each individual object within the user-selected location includes information about accuracy of boundaries of each individual objects within the user-selected location.

13. The method of claim 10, wherein the predicted risk for a given portion of the user-created flight path reflects likelihood of experiencing a collision with one or more of the objects at or near the given portion of the user-created flight path.

14. The method of claim 10, wherein each risk confidence score varies based upon the risk parameters.

15. The method of claim 14, wherein the object existence accuracies reflect a higher object existence accuracy for stationary objects and a lower object existence accuracy for moving objects.

16. The method of claim 10, further comprising:
tracking position of the unmanned aerial vehicle during an unmanned aerial flight.

17. The method of claim 16, further comprising:
determining updated predicted risk based upon the tracked position of the unmanned aerial vehicle.

18. The method of claim 17, wherein the updated predicted risk reflects a likelihood of experiencing a collision with one or more objects at or near the tracked position of the unmanned aerial vehicle.

* * * * *